United States Patent [19]

Saito et al.

[11] 4,379,002

[45] Apr. 5, 1983

[54] METHOD AND EQUIPMENT FOR DIVIDING SLABS INTO PREDETERMINED WIDTHS

[75] Inventors: Sadayuki Saito, Yotsukaido; Hiroji Moriwaki, Chiba; Kazuya Higuchi, Ichihara, all of Japan

[73] Assignee: Kawasaki Steel Corporation, Hogyo, Japan

[21] Appl. No.: 342,448

[22] Filed: Jan. 25, 1982

[30] Foreign Application Priority Data

Jun. 22, 1981 [JP] Japan ................................. 56-95375
Oct. 20, 1981 [JP] Japan ................................. 56-166306

[51] Int. Cl.³ .............................................. B23K 7/02
[52] U.S. Cl. .................................... 148/9 R; 266/50
[58] Field of Search ......................... 148/9 R; 266/50

[56] References Cited

U.S. PATENT DOCUMENTS

4,208,039  6/1980  Höffken et al. ...................... 266/50

Primary Examiner—W. Stallard
Attorney, Agent, or Firm—Sughrue, Mion, Zinn, Macpeak & Seas

[57] ABSTRACT

In the process of conveying a slab from continuous casting or large ingot casting equipment by means of a conveyance table comprising conveyance rollers, the slab is stopped on the table and raised therefrom and, at the raised position, the slab is divided lengthwise thereof by gas cutting into at least two. The divided slabs are individually transferred to the downstream, where slags formed on the lower end edge of the cut surface of each divided slab are continuously removed.

8 Claims, 17 Drawing Figures

METHOD AND EQUIPMENT FOR DIVIDING SLABS INTO PREDETERMINED WIDTHS

BACKGROUND OF THE INVENTION

1. Field of the Invention

The present invention relates to a method and equipment for dividing slabs into predetermined widths.

2. Description of the Prior Art

There have in the late years been many cases in which a slab produced by continuous casing equipment or blooming mill is split lengthwise into sections of predetermined width. When to obtain small-width slabs, for instance, if they are each made as predetermined in continuous casting equipment or a small ingot casting mold, their productivity is low and that uneconomical.

For such reasons, it is customary in the prior art to manufacture, by continuous casting equipment or a large ingot casting mold, a slab having a width of an integral multiple of predetermined dimension and then divide, by means of gas cutting, the slab lengthwise into at least two, obtaining slabs of the desired width.

Nevertheless, such dividing work, instead of being made on the slab conveying table, is carried out after shifting the slab elsewhere; so its shift is very troublesome.

For instance, the slab having a width of an integral multiple of the present dimension, manufactured by continuous casting or large ingot casting equipment (hereinafter referred to simply as continuous casting equipment), is shifted by the conveying table for specified treatment but, in this case, the slab has to be removed by a lifting magnet crane or the like from the conveyance table to somewhere else, for example, to an earth floor where to divide the slab lengthwise by means of gas cutting. After the dividing operation, the individual slabs each have again to be moved by a crane or the like from the earth floor to the conveyance table or somewhere else for the next treatment. Consequently, such slab shifting operations involve much troublesomeness, affecting the productivity of slab manufacture. To avoid this, a slab dividing device has been proposed which divides the slab of an integral-multiple width by gas cutting on the conveyance table. Even such a proposed device is attended with the possible danger of cutting rollers of the conveyance table when the slab is divided by gas cutting in the state of being carried by the table. Accordingly, the slab to be cut is conveyed by the conveyance table, whereas the torch of the cutting device used is held as fixed in respect of the conveyance table and it is constituted not to interfere with the conveyance rollers.

With the slab dividing device of such an arrangement, however, since the slab is cut while being moved relative to the fixed cutting torch, it is necessary to carry out centering of the slab precisely but this centering is extremely difficult. That is to say, the centering of the slab is performed by moving it along a guide. In this case, the slab movement must be constituted not to stop by being interfered with by the guide.

However, there exist unevennesses on the side surfaces of the slab, which are invisible to the naked eye, so they are liable to catch the gide, causing the slab to stop. To eliminate such catches, the guide has to be constituted as a large-scale device. And, as the guide is so designed as to be detachable after the centering operation, errors can occur in the center of the slab during its movement, owing to warping of the slab in its lengthwise direction, which obstruct high-precision dividing of the slab.

In addition, since along the underside edges of the cut surface of each slab there are deposited slags, if the slab is rolled in that state, the slags cut deeply into the slab, remaining therein as permanent impurities. It is therefore necessary to eliminate such slags before rolling. Nevertheless, in actuality, the elimination of such slags is now carried out manually after turning over the slab following the dividing operation.

SUMMARY OF THE INVENTION

In view of the abovesaid shortcomings of the prior art, it is an object of the present invention to provide a slab dividing method and equipment therefor according to which a slab of a two-fold width, for example, is divided into two by means of gas cutting on the conveyance table in the manner of causing no damage to the conveyance rollers and, further, slags incidental to the gas cutting operation is automatically removed from the post-divided slabs without turning them over.

According to an aspect of the present invention, the slab being carried by the conveyance table from continuous casting equipment is stopped and raised from the table and, at the raised position, it is divided lengthwise by gas cutting into at least two. Thereafter, the divided slabs are sequentially returned onto the conveyance table to move downstream, where slags attached to the lower end edges of the slabs are removed by melting the slags.

Hence, in the process of the slab being conveyed on the rollers from the continuous casting equipment, it is divided lengthwise into at least two parts while being held in the raised position. For this reason, such procedures can be saved as moving the slab from the conveyance table to elsewhere to be divided and to be returned thereto after the dividing operation; in addition to this, the slab is raised from the conveyance table to eliminate the possibility of the rollers being damaged by the gas cutting operation.

Further, the divided slabs are carried by the conveyance table to a slag removing device by gas melting provided downstream of the slab dividing position, where they have their deposited slags removed, so that the slabs can be rolled without leaving thereon scars and the manual work to clear away the slags is not necessitated.

According to another aspect of the present invention, the slab is held stationary at the aforementioned raised position and subjected to the gas cutting by moving the gas cutting torch in the lengthwise direction of the slab to divide it into at least two parts.

Accordingly, if centering is effected of the gas cutting torch, the slab in the fixed or stationary state can be saved wholly of centering, so that the centering work can be performed with much ease and the slab can be divided with high accuracy.

BRIEF DESCRIPTION OF THE DRAWINGS

FIGS. 3(a to (f), inclusive, show a sequence of steps involved in dividing a slab and removing slags from the divided slabs in accordance with the method of the present invention;

DESCRIPTION OF THE PREFERRED EMBODIMENTS

Figure 1:
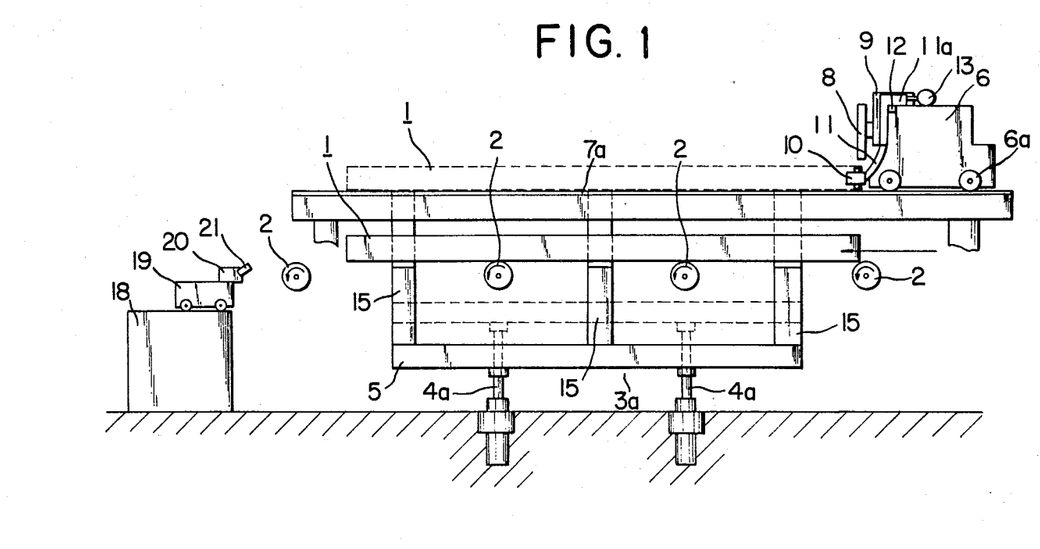
FIG. 1 is a front view illustrating an embodiment of the slab dividing equipment of the present invention.
Figure 2:
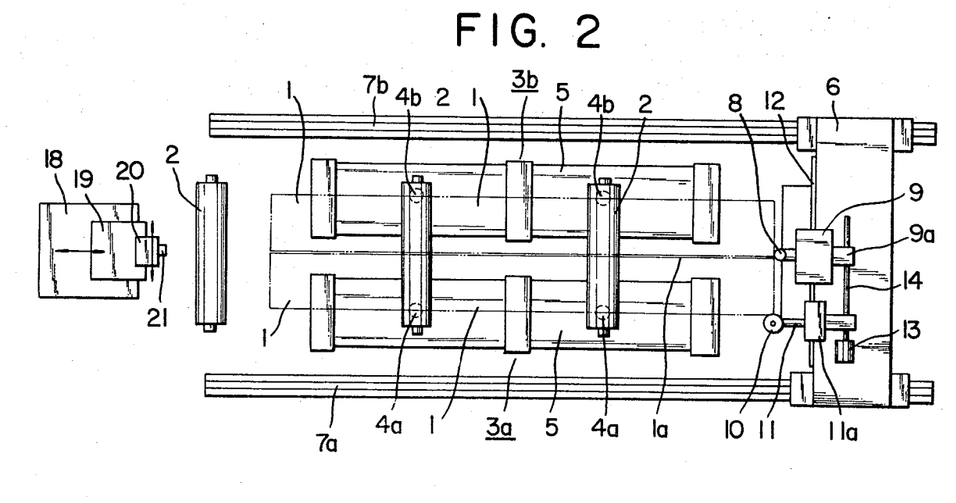
FIG. 2 is its plan view.

In FIGS. 1 and 2, reference numeral 1 indicates a slab turned out by continuous casting equipment, the width of the slab 1 being an integral multiple of a width of individual slabs desired to ultimately obtain. The slab 1 is conveyed on a table which comprises rollers 2 disposed at equal intervals. The slab 1 is conveyed from the continuous casting equipment to the next disposition site, for instance, in the arrow-indicated direction. On the way of conveyance, that is, on the way of the conveyance table there are set up at least two lift means 3a and 3b, by which to raise the slab 1 to be held at this position. Though these lift means 3a and 3b are placed in parallel as shown in FIG. 2, they are identical in construction with each other. The lift means 3a and 3b respectively consist of a plurality of cylinders 4a and 4b and a support beam 5 supported by such cylinders in a manner to be movable up and down, the support beam 5 having mounted thereon slab receptacles 15. For this reason, the slab 1 delivered from the continous casting equipment is raised from the solid line position to the broken line position in FIG. 1 and is held at such a raised position.

A gas cutting device is provided avove the conveyance table in opposing relation to the lift means 3a and 3b. The gas cutting device has a pair of parallel rails 7a and 7b and a movable truck 6 which has wheels 6a fixed thereto to run on the parallel rails 7a and 7b. And, on this movable truck 6, there is disposed a table 9 movable along a guide rail 12 which perpendicularly crosses the rails 7a and 7b for the movable turck 6, and there is installed a gas cutting torch 8. Further, the moving table 9 has attached thereto a guide roller 10 which makes rotary contact with one side surface of the slab 1 during the slab dividing operation so that the cutting torch 8 is guided by the guide roller 10 when the former moves in the lengthwise direction of the slab 1 for cutting it. That is to say, the guide roller 10 is rotatably supported as by an arm-like slide member 11, which is adapted so that its slide section 11a may slide along the abovesaid guide rail 12. Further, the slide member 11 is connected with a coupling rod 14, which carries at one end press means 13, such as an air cylinder or the like, for urging the guide roller 10 against one side surface of the slab 1. Accordingly, at the time of the gas cutting operation, the truck 6 moves lengthwise of the slab 1 while being guided by the guide roller 10 pressed against the side surface of the slab 1 by dint of the press means 13, so the cutting torch 8 is guided along the center dividing line 1a, whereby the slab 1 can be divided accurately. Incidentally, the movable truck 9 has a retaining piece 9a to retain the coupling rod 14.

With such a slab dividing equipment, the slab 1 can be easily and precisely divided as shown in FIGS. 3(a) to (d) while being in transit from the continuous casting equipment by means of the conveyance table.

Figure 3A:
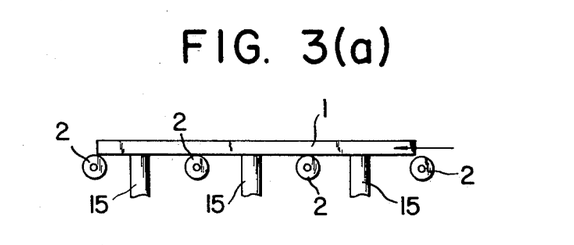
Figure 3B:
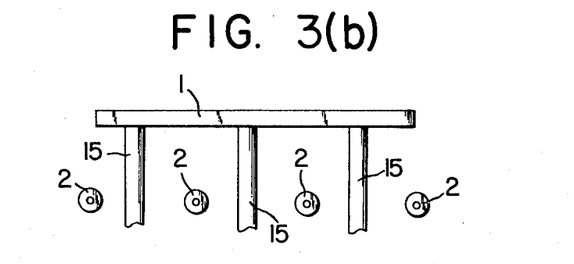
Figure 3C:
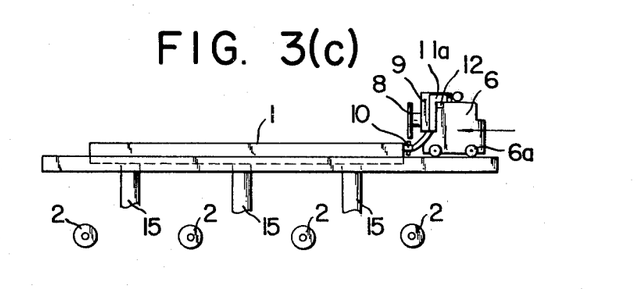

In the first place, the slab 1 of a two-fold width, for instance, is turned out by the continuous casting equipment and conveyed by the rollers 2. At the time of division, the slab 1 is stopped temporarily at the lift means 3a and 3b (see FIG. 3(a)), after which the cylinders 4a and 4b of the lift means 3a and 3b are activated, thereby lifting the slab 1 up to the height of cut and then holding it at that elevation as shown in FIG. 3(b). Following it, the truck 6 is moved along rails 7a and 7b, and the slab 1 is divided along its center dividing line 1a by means of the gas cutting torch 8 mounted on the moving table 9. In this case, the guide roller 10 is set at a position spaced the one-half of the slab width apart from the position of the cutting torch 8; and the guide roller 10 moves in contact with one side surface of the slab 1 while being pressed thereagainst by the press means 13. With gas cutting flames emitting from the cutting torch 8, it advances along the line 1a to divide the slab 1 into two (see FIG. 3(c)).

Figure 3D:
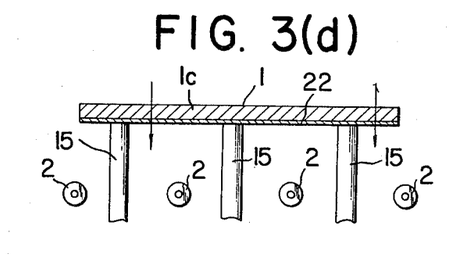
Figure 3E:
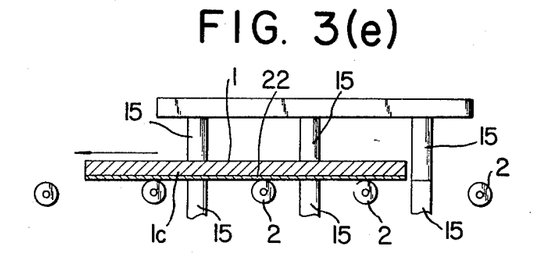

If the space between cutting torch 8 and the guide roller 10 is initially set by adjusting the position of the moving table 9, to ½ of the slab breadth, for instance, it is always possible to cut the slab 1 as the guide roller 10 is being pressed by the force of the press means 13, even though the roller 10 moves breadthwise of the slab 1 due to its undulations. Thus it is always possible to cut the slab 1 to ½ breadth. After finish of the dividing operation, one of the two divided slabs is set down on the conveyance rollers 2 and then the other slab onto the conveyance roller 2 as shown in FIG. 3(d). As for the lifting device and the gas cutting device, even though they are not constituted as above-said, they can also be constituted in association with the conveyance table as illustrated in FIGS. 4 to 7 if the slab on the conveyance table is given precentering.

Figure 6:
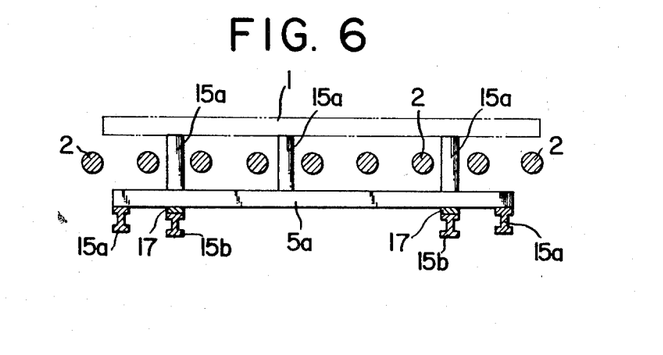
Figure 7:
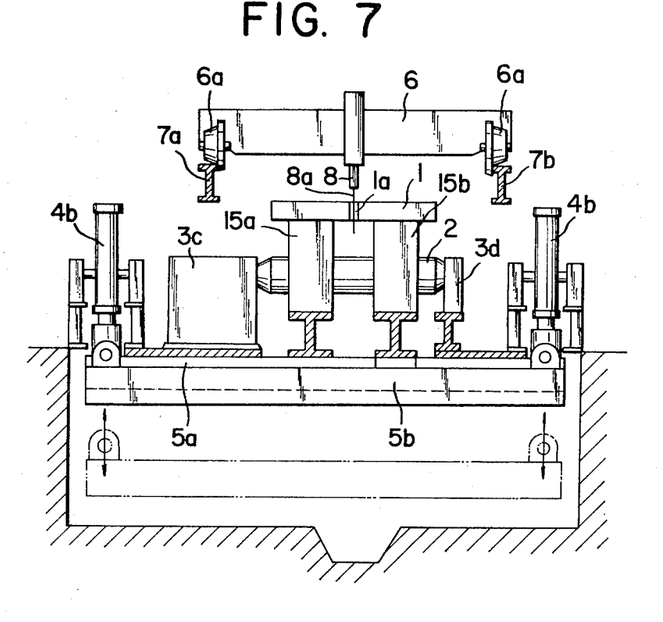
FIG. 7 is a side view as viewed from the direction of the line C—C in FIG. 1.

In FIGS. 4 to 7, the conveyance table is constituted by parallel rollers 2 disposed horizontally at substantially equal intervals as in FIGS. 1 and 2. The rollers 2 are rotatably supported at one end by a line shaft table 3c and at the other end by bearings 3d. Above the conveyance table is set the gas cutting device as shown in FIG. 7 and the gas cutting device is equipped with the gas cutting torch 8 that emits flames 8a downwardly for cutting the slab 1. The cutting torch 8 is set on the moving truck 6 almost centrally thereof, with the wheels 6a rolling on the pair of rails 7a and 7b. The gas cutting device shown in FIG. 7 is not equipped with the waving table 9, the guide-roller 10 and the guide roller pressurizing mechanism composed of the slide member 11, the coupling rod 14 and the press means 13 which are employed in FIGS. 1 and 2. Even with such an arrangement, however, the slab 1 can be divided along the central dividing line 1a without much hindrance.

Figure 4:
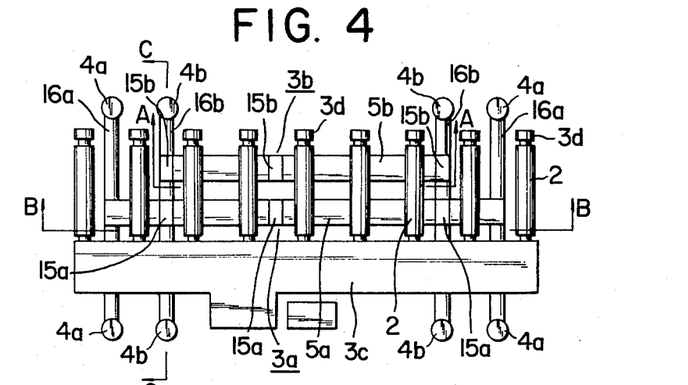
FIG. 4 is a plan view illustrating another embodiment of the present invention.
Figure 5:
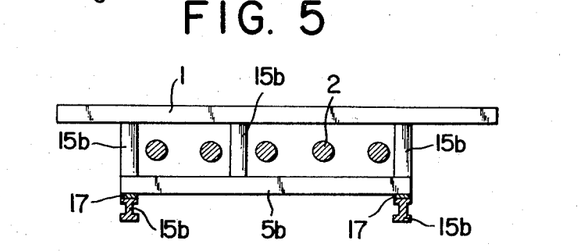
FIGS. 5 and 6 are sectional views taken on the lines A—A and B—B in FIG. 4, respectively.

Under the rollers 2 of the conveyance table are installed the lift means of the same number as divided slabs desired to obtain; for instance, in the case of the slab from the continuous casting equipment being divided into two, there are provided two lift means 3a and 3b as in the case with FIGS. 1 and 2. The lift means 3a is constituted by disposing two pairs of support frames 16a and 16b breadthwise of the slab 1, that is, in parallel with the conveyance rollers 2 and bridging a support beam 5a between a pair of support frames 16b and 16b and then setting the slab receptacle 15a on the support beam 5a. The other lift means 3b also has a support beam 5b bridged between the other pair of support frames 16a and 16b and a slab receptacle 15b mounted on the support beam 5b. Thus, by constituting the support frames 16a and 16b of each pair so that they may freely move up and down independently of the other pair, divided slabs can be successively aligned to be transferred by the conveyance rollers 2. For instance, with the lift means 3a, each support frame 16a is suspended at both ends by the cylinders 4a in a manner to be driven up and down. Likewise, with the other lift means 3b, too, both ends of each support frame 16b are suspended by the cylinders 4b so that the support frame 16b is thereby moved up and down. Besides, the cylinders 4a and 4b are each installed on a support stand (as shown in FIGS. 4 and 6 wherein only the support stand 17 of each cylinder 4a) on the floor, and their lower ends are connected to the support frames 16a and 16b of the respective pairs. On the other hand, the support beam 5a is mounted on the support frame 16a with a spacer 17 disposed therebetween (see FIG. 6) so that the lift means 3a may not be interfered with by the other lift means 3b. By installing the support beams 5a and 5b at different levels as described above, the lift means 3a and 3b can function without any interference with each other.

Figure 8:
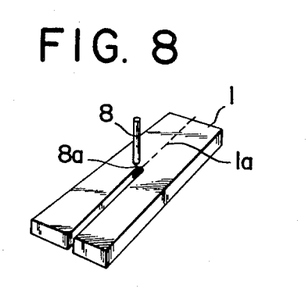
FIG. 8 is a partial view showing the slab cutting operation.

With such an arrangement, the slab 1 conveyed by the conveyance rollers 2 from the continuous casting equipment is once stopped on the way of conveyance and, in this case, since the guide roller 10 is not provided unlike in the case of FIGS. 1 and 2, centering of the slab 1 is effected first and then the both lift means 3a and 3b are simultaneously operated to elevate the slab 1 on the conveyance rollers 2 and to hold it at its elevated position. In other words, by activating the cylinders 4a and 4b simultaneously to lift the support frames 16a and 16b concurrently, together with the support beams 5a and 5b and the slab receptacles 15a and 15b thereon, thus bringing up the slab 1 which is held horizontally over the conveyance table. Then the position where the slab 1 is held, the moving truck 6 of the gas cutting device is brought, dividing the slab 1 by the cutting torch 8 along the central dividing line 1a. At this time, the truck 6 moves lengthwise of the slab 1 which has already undergone precentering, so that the cutting torch 8 can precisely divide the slab 1 along the present central dividing line 1a as shown in FIG. 8. During this dividing operation, too, as the slab 1 is being held by the two lift means 3a and 3b above the conveyance rollers 2, there is no possibility of the rollers being damaged by the flames of the cutting torch 8. And, as the slab 1 is held by the slab receptacles 15a and 15b of the lift means 3a and 3b in alignment with the central dividing line 1a, the cutting operation of the cutting torch 8 cannot be obstructed by the receptacles 15a and 15b. Incidentally, after completion of the cutting operation, the lift means 3a and 3b are lowered one after the other by operations reverse to those for raising them, whereby the divided slabs are redelivered onto the conveyance rollers 2 and then subjected to the next process.

That is to say, during the gas cutting operation by the cutting torch 8 slags are apt to be formed on the lower edges of the cut surfaces of the divided slabs and must be removed. Accordingly, the divided slabs have to be conveyed separately. For this reason, the support frame 16a of the one lift means 3a is lowered first by extending the cylinders 4a, whereby only the divided slab supported by the lift means 3a is brought down onto the conveyance rollers 2. Following this, the support frame 16b of the other lift means 3b is set down to deliver the divided slab to the conveyance rollers 2.

For removing the slags attached to the lower edges of the cut surface of the divided slabs, a skimmer is provided downstream of the gas cutting device. With the skimmer, the divided slabs conveyed thereto by the conveyance rollers 2 are automatically removed of slags formed on the lower edges of their cut surfaces, without being turned over. As shown in FIGS. 1 and 2, the skimmer comprises a travelling truck 19 which is mounted on a stand 18 and moves in the direction of conveyance of each divided slab, an alignment truck 20 which is mounted on the travelling truck 19 and moves perpendicularly to the direction of conveyance of the divided slab, and a skimming nozzle 21 which is mounted on the alignment truck 20. The skimming nozzle 21 is disposed slantingly upward, unlike the cutting torch 8 of the gas cutting device.

Figure 3F:
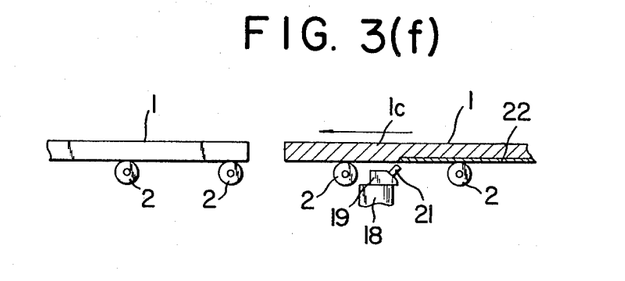

When each divided slab conveyed by the conveyance rollers 2 has reached the skimmer, flames are slantly emitted up from the skimming nozzle 21 of the skimmer to remove slags 22 deposited on the lower end edge of the cut surface of the slab 1, as shown in FIG. 3(f). It is preferable that when once stopping the divided slab 1 just before the skimming nozzle 21, the leading end of the slag 22 be preheated momentarily, after which, by driving the rollers 2, the slab 1 is moved forward to be subjected to the slagging off operation. Such operations of stop and advance may be carried out by the means of signals which are produced by a timer, photoelectric tube, numerical controller or the like. After the finish of the slagging off of the one divided slab 1, the other divided slab is lowered onto the conveyance roller 2 as shown in FIG. 3(f) and is similarly brought to the skimmer, where it is removed of slags attached thereto. Incidentally, when to actuate the skimming nozzle 21, the position of the cut surface of the divided slab 1 is shifted correspondingly. Consequently, when to remove the slags attached to the one divided slab after the slagging off of the other divided slab, the skimming nozzle 21 is set by slightly moving it perpendicularly to the direction of conveyance of the slab. To this end, the alignment truck 20 having mounted thereon the nozzle 21 is constituted in the manner of its center being movable by adjustment in the truck 19 by means of a fine control mechanism such as a rail feeder, screw feeder, etc.

It is also possible to mount means on the alignment truck 20 for detecting the cut surface and the underside of the divided slab by tracing them.

Figure 9:
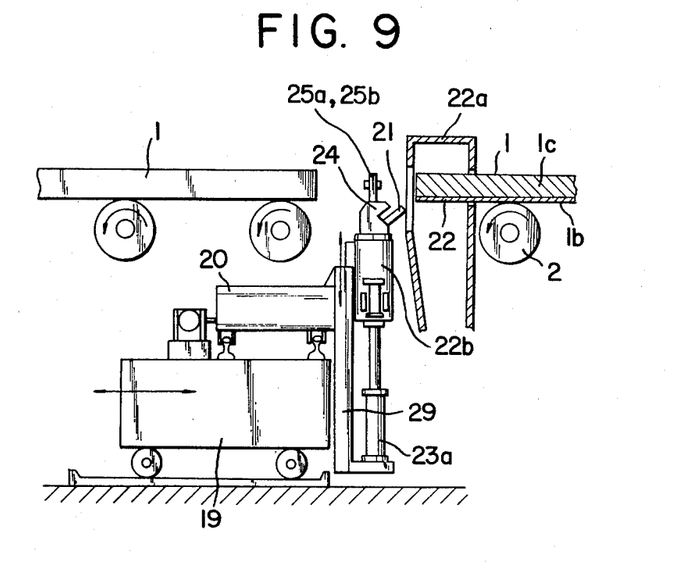
FIG. 9 is a side view illustrating a slag removing device in accordance with another embodiment of the present invention.
Figure 10:
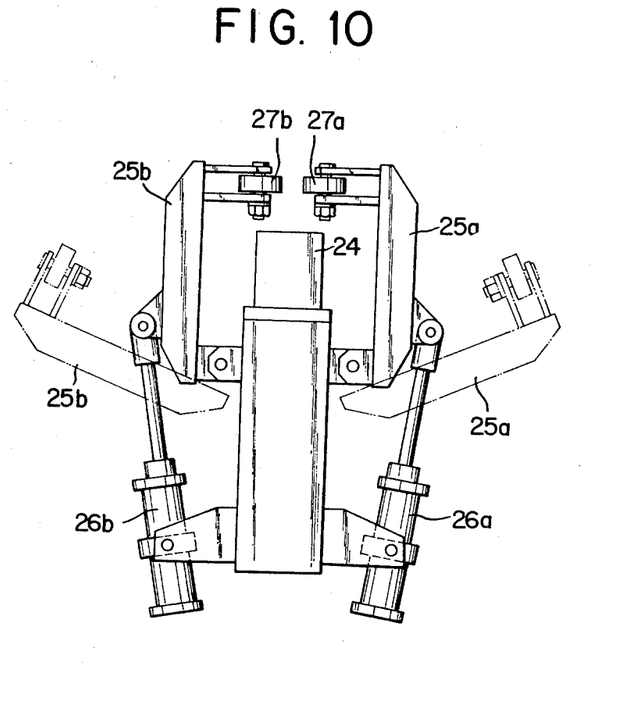
FIG. 10 is a front view showing, by way of example, a device for detecting and profiling the cut surface of the divided slab.
Figure 11:
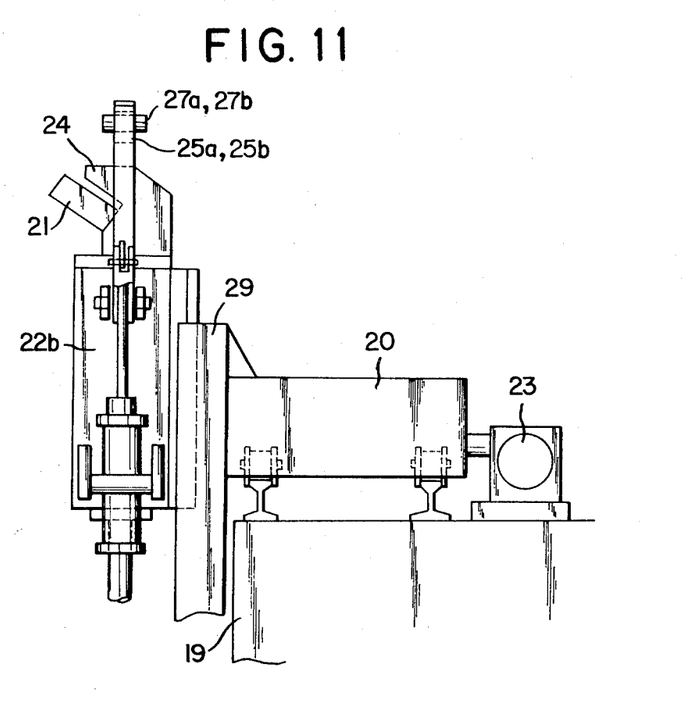
FIG. 11 shows on an enlarged scale a portion of FIG. 9.

In FIG. 9, the divided slab 1 is carried by the conveyance rollers 2 driven in the direction indicated by the arrows. Reference numeral 22a designates a dust collecting hood which collects dust in smoke or the like during the slagging off operation. On the lower end edge of the cut surface of the slab 1 are formed slags. Under the conveyance rollers 2 are disposed the truck 19 and the alignment truck 20, the latter being constituted in a manner to be movable by a cylinder 23 in a direction perpendicular to the direction of conveyance of the slab 1 (see FIG. 12). On the alignment truck 20 is installed a guide frame 29 and a lift member 22b is provided to be movable up and down under the guide of the guide frame 29. The lift member 22b has at its top end a contact member 24, the tip of which makes contact with the underside 1b of the slab 1 to trace it during the slag removal. In addition to the slab underside detecting-tracer means composed of the contact member 24, the lift member 22b has mounted thereon the skimming nozzle 21 and cut surface detecting-tracer means. The cut surface detecting-tracer means, as illustrated in FIG. 10, has a link mechanism around the lift member 22b—the link mechanism comprising a pair of trace members 25a and 25b and cylinders 26a and 26b. The trace members 25a and 25b have attached thereto guide rollers 27a and 27b in opposing relation. With such an arrangement, it is possible to effect the positioning of the skimming nozzle 21 with respect to the cut surface and the underside of the slab, making it possible to automatically clear the slags deposited continuously on the lower end edge of the cut surface of the slab.

Figure 12:
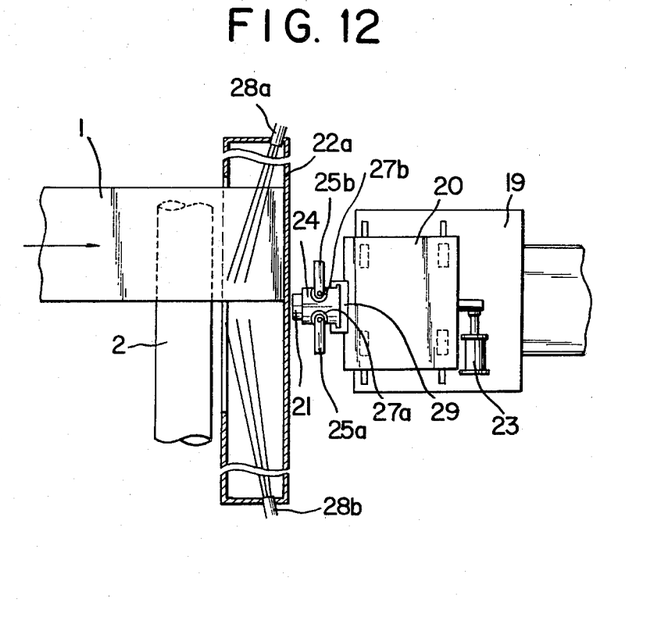
FIG. 12 is a plan view of the slag removing device depicted in FIG. 9.

The divided slab 1 is conveyed from the direction indicated by the arrows in FIGS. 9 and 12; in which case, the entirety of the skimmer lies under the conveyance path line and the divided slab 1 is stopped as shown in FIG. 9 when its leading portion has reached right above the skimmer. In this case, the pair of trace members 25a and 25b are left open (as indicated by the broken lines in FIG. 10) by actuating the cylinders 26a and 26. In this state, the lift member 22b is raised by the cylinder 23a to bring the contact member 24 into contact with the underside 1b of the divided slab 1, detecting its position. Thereafter, the contact member 24 is lowered about 10 mm and then the alignment truck 20 is moved about 100 mm in the widthwise direction of the divided slab 1, while, on the other hand, the one trace member 25b is brought from the broken line position to the solid line one by the cylinder 26b and, in this state, the alignment truck 20 is moved to urge the guide roller 27b of the trace member 25b against the cut surface of the divided slab 1. This allows ease in determining the position of the cut surface of the divided slab 1 from which slags have to be removed. Further, the truck 19 is moved back so that the skimming nozzle 21 may be spaced a certain distance apart from the leading end face of the divided slab 1. Then, the cylinder 26a is actuated to move the other trace member 25a from the broken line position to the full line position, after which the truck 19 is moved forward to bring the trace member 25a into contact with the leading portion of the divided slab 1. Following this, the truck 19 is retreated approximately 100 mm and then the trace member 25a is moved from the full line position to the broken line one, thus establishing the position of the skimming nozzle 21.

After determining the position of the cut surface of the divided slab 1 as described above, the skimming nozzle 21 is ignited and the divided slab 1 is moved, whereby the slags attached to the lower end edge of its cut surface can automatically be eliminated. At the start of this slagging off operation, the one trace member 25b does not trace the cut surface of the divided slab 1 until the slab has advanced 100 mm or so but, thereafter, the trace member 25b makes contact with the slab cut surface. When the divided slab 1 has advanced about 100 mm, the contact member 24 is moved into contact with the underside 1b of the slab 1 to trace it.

After completion of the slagging off operation, the one trace member 25b is moved to the broken line position and the lift member 22b is also lowered. In the case of removing slags from the other divided slab after the one divided slab, the operations of the trace members 25a and 25b are reversed. In the skimmer of the abovesaid arrangement, it is preferred to instal a pair of high-pressure water nozzles 28a and 28b as depicted in FIG. 12. When the slags are being removed, there is the fear that they scatter before the skimming nozzle, thereby attaching to the dust collecting hood 22a and the rollers 2. In this respect, if high-pressure water is jetted out of the water nozzles 28a and 28b, the slags being removed are blown off laterally. As the contact member 24 is constituted to be movable up and down by the cylinder 23a, it is able to sufficiently trace the underside 1b of the divided slab 1 even if it warps lengthwise. Besides, in the case of removing slags from either one of the divided slabs, it is possible to pre-specify one of them, so that it is preferable to displace the truck 19 about 100 mm to left or right from the center of the conveyance table. For instance, in the case of removing slags from the one divided slab, if the truck 19 is displaced about 100 mm, for example, to right from the center of the conveyance table, the contact member 24 does not contact the slag attaching portion. And, the leading end face of each divided slab is detected by contacting therewith any one of the trace members but a leading end face detector may also be provided instead of such trace member and the contact member can be formed by a roller. The alignment truck 20 can also be constituted to be movable along a guide rail. Also it is possible to constitute the truck 19 to be movable by a cylinder and to constitute the pair of trace members to freely raise and lower the alignment truck via a link mechanism, instead of arranging the pair of trace members to be freely moved up and down by the cylinders.

It will be apparent that many modifications and variations may be effected without departing from the scope of the novel concepts of this invention.

What is claimed is:

1. A slab dividing method comprising the steps of:
   stopping a slab being conveyed by conveyance rollers;
   raising the slab from the conveyance rollers;
   dividing, at the raised position, the slab lengthwise thereof by gas cutting into at least two;
   returning the divided slabs onto the conveyance rollers one after the other; and
   conveying the divided slabs to the downstream, where slags formed on the lower end edges of the cut surface of each slab are removed.

2. A slab dividing method according to claim 1 wherein the slab is held stationary at the raised position and a gas cutting torch is moved in the lengthwise direction of the slab to cut it into at least two.

3. Slab dividing equipment comprising:
   a slab conveyance table constituted by conveyance rollers disposed flush with one another and at intervals;
   slab lift means provided in association with the conveyance table;
   gas cutting means provided above the slab lift means for dividing a slab lengthwise thereof by gas cutting; and
   slag removing means provided downstream of the gas cutting means for removing slags formed or each divided slab during the gas cutting.

4. Slab dividing equipment according to claim 3 wherein the slab lift means comprises a pair of lift frames provided under the conveyance table, support beams respectively bridged between the pair of lift frames, and slab receptacles mounted upwardly on the support beams at such positions where they can pass between the conveyance rollers, and the pair of lift frames are constituted to be movable up and down.

5. Slab dividing equipment according to claim 3 wherein the gas cutting means comprises a pair of parallel guide rails disposed on both sides of the slab held at the raised position to extend in the lengthwise direction of the slab, a truck movable on the pair of guide rails, and a gas cutting torch mounted downwardly on the truck substantially centrally thereof.

6. Slab dividing equipment according to claim 5 wherein the truck has mounted thereon a moving table movable in the widthwise direction of the slab; the gas cutting torch is mounted on the moving table; a coupling rod is provided to extend from the moving table to the widthwise direction of the slab; the coupling rod has a slide member slidable thereon; a guide roller is supported by the slide member; and the guide roller is constituted to be rotatable so that it makes rotary contact with one side surface of the slab.

7. Slab dividing equipment according to claim 3 wherein the slag removing means comprises a reciprocating truck reciprocating in the lengthwise direction of the slab, an alignment truck moving along a rail perpendicular to the direction of travel of the reciprocating truck, and a skimming nozzle mounted upwardly on the alignment truck.

8. Slab dividing equipment according to claim 7 wherein a lift member is mounted on the alignment truck in a manner to be movable up and down; and the lift member has mounted thereon the skimming nozzle slantingly upward, a contact member for detecting the position of the skimming nozzle with respect to the underside of each divided slab and tracing it when removing slags formed on the lower end edge of the cut surface of the slab, and a cut surface detecting-trace member making contact with the cut surface of the divided slab and tracing it to tetect the position of the skimming nozzle with respect to the cut surface.

* * * * *